Sept. 19, 1950 G. M. TRACY 2,522,767
WEIGHING MACHINE
Filed June 13, 1945 2 Sheets-Sheet 1

Inventor
Glen M. Tracy
By Bacon & Thomas
Attorneys

Sept. 19, 1950            G. M. TRACY            2,522,767

WEIGHING MACHINE

Filed June 13, 1945                                         2 Sheets-Sheet 2

Inventor
Glen M. Tracy

By Bacon & Thomas

Attorneys

Patented Sept. 19, 1950

2,522,767

UNITED STATES PATENT OFFICE 2,522,767

WEIGHING MACHINE

Glen Melvin Tracy, Durham, N. C., assignor to Wright Machinery Company, Durham, N. C., a corporation of North Carolina Application June 13, 1945, Serial No. 599,141

29 Claims. (Cl. 265—43)

This invention relates to improvements in weighing machines and more particularly is concerned with a machine of the liquid-displacement type, i. e., a machine wherein a volume of liquid is displaced by the material being weighed which corresponds to the weight of the material.

One object of the invention is to provide a machine characterized by features which enable it to be adapted with facility to either weighing at will or automatic weighing.

A further object is a machine wherein the movements of the parts are reduced to a minimum, this object contemplating a machine which is so designed that the liquid-displacing elements may be pre-loaded so that no movement of the parts of the machine occurs until the proper amount of material is introduced into the receiver.

A still further object is to provide a machine which is accurate and not unduly influenced by temperature changes and wherein any tendency of hunting, or balancing, of the weight-sensitive parts is avoided.

A still further object is a novel design and arrangement of the parts of the machine, whereby to achieve simplicity and compactness in construction and accuracy and speed in operation, enable the necessary adjustments for weighing different amounts of material to be made with facility, and reduce friction and the effects thereof to a minimum.

The invention is illustrated in the accompanying drawings, in which.

Figure 2:
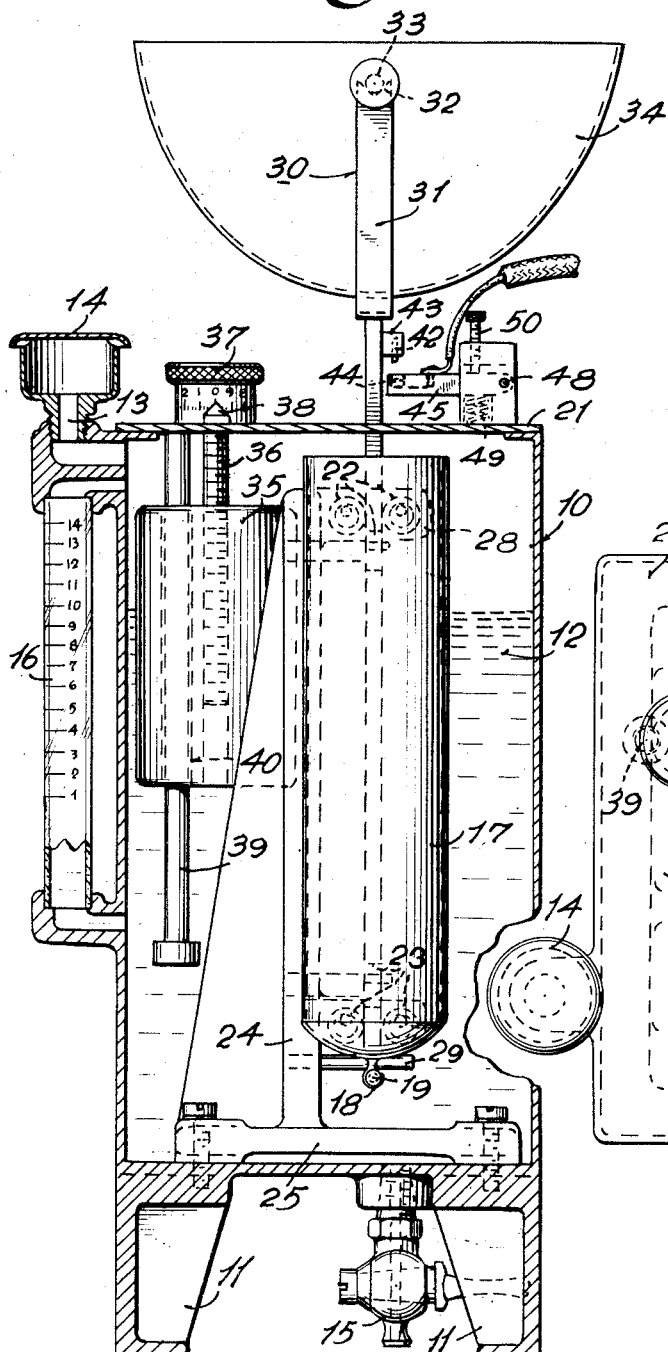
Figure 2 is a similar section taken along line 2—2 of Figure 1.

The machine, as illustrated, includes a tank 10 having feet 11 by which it may be supported. The tank contains a body of liquid 12 which may be oil of a low viscosity or any other suitable low viscosity liquid. The liquid may be introduced into the tank through an inlet 13 (Figure 2), the latter being normally closed by a filler cap 14. A cock 15 in the bottom of the tank is available to drain the tank or to lower the level of the liquid in the latter if this should be desired. A transparent, suitably graduated tube 16 which is mounted on one side of the tank serves as a gauge and indicates the level of the liquid in the tank.

The invention contemplates the weighing of material by displacement of the liquid 12 in the tank 10 is proportion to the weight of such material. To this end a pair of spaced-apart, elongated cylindrical floats 17 are employed. The floats 17 are of small diameter relative to their height and are preferably formed of light weight material and, as shown, are partially immersed in the body of liquid 12 in the tank 10. The floats 17 are rounded or dome-shaped at their lower ends and carry hooks 18 which engage reduced portions of opposite ends of a cross-piece 19, the latter being carried by the lower end of a vertical bar 20. The bar 20 which, as illustrated, is rectangular in cross section extends through a suitable opening formed in the cover 21 of the tank 10. Free guiding movement of the said bar in the direction of its length is permitted by upper and lower sets of rollers 22 and 23, respectively, which are mounted on the vertical column 24. The latter is located between the two floats and extends upwardly from a base 25 which is secured to the bottom of the tank.

Figure 1:
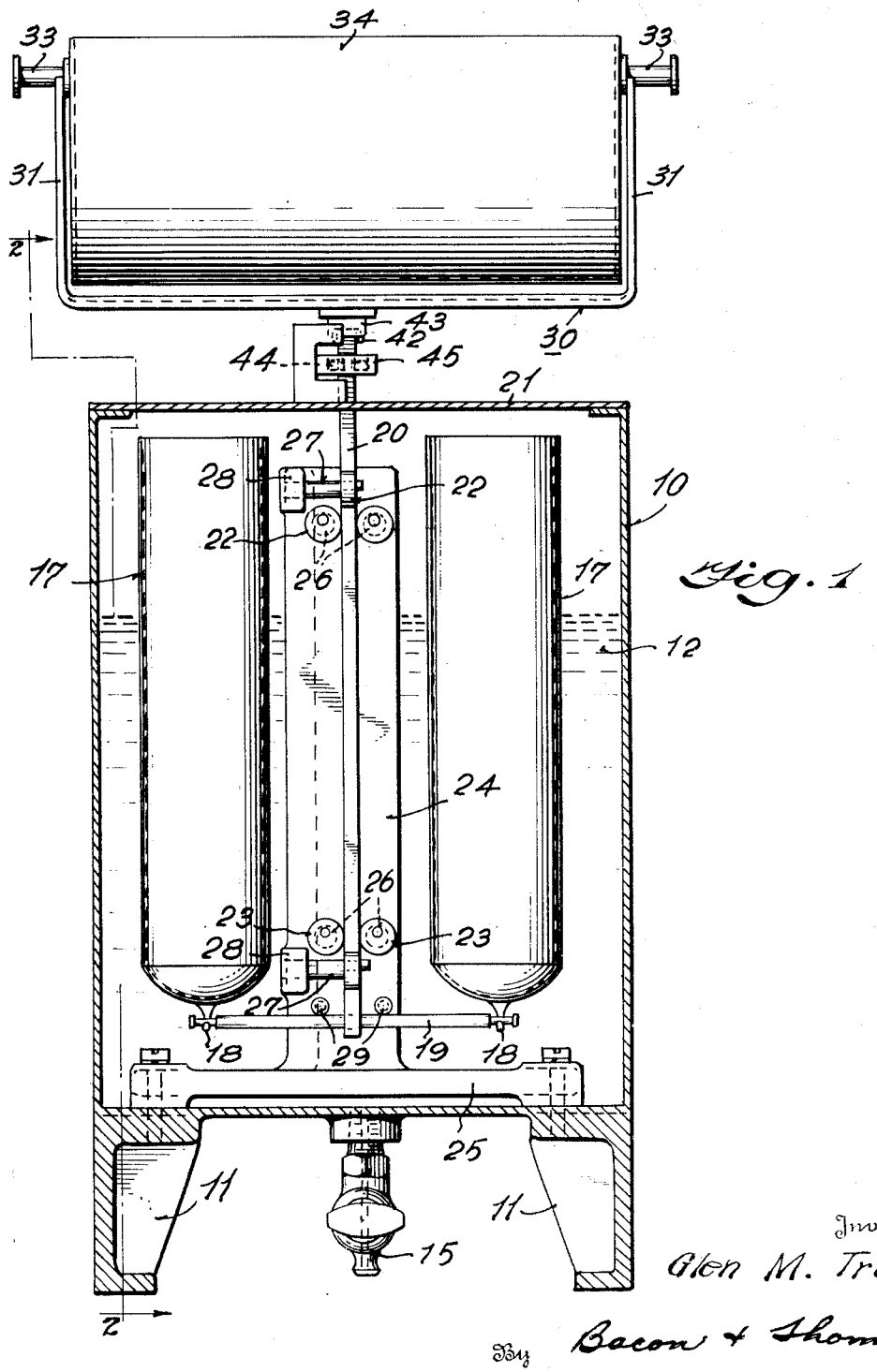
Figure 1 is a vertical sectional view through a machine embodying the features of the invention.

Each set of rollers 22, 23, includes two pairs of rollers. One pair of rollers of each set contacts two of the opposite sides of the bar 20 while the other pair of rollers of each set contacts the other two opposite sides of the bar. The rollers therefore which are preferably of the anti-friction type permit free movement of the bar in the direction of its length. Lateral movement in any direction, however, is prevented. In this connection it will be noted that the lower pair of rollers of the upper set 22 and the upper pair of rollers of the lower set 23 are mounted upon studs 26 which are carried directly by the body of the column 24. The remaining pairs of rollers of the upper and lower sets are mounted on studs 27 which are carried by laterally extending arms 28. In order to provide for adjustment of the various rollers of the sets 22 and 23, the studs 26 and 27, as best shown in Figure 1, are formed to provide eccentric mountings. When so formed, the studs may be adjusted so that the rollers will engage the bar 20 in such a manner as to insure proper movement of the bar with a minimum of friction.

To the end that the floats 17 may be pre-loaded in such a manner that movement of the receiver in response to the material introduced into it will not occur until such material approaches the predetermined weight for which the machine is adjusted, stop pins 29 are carried by the column 24. The stop pins extend laterally from the column 24 and across the cross-piece 19 to limit upward movement of the cross-piece, and hence of the floats 17. Assuming the level of the liquid 12 in the tank 10 to be as shown, it will be apparent that the floats 17 are held immersed below the level corresponding to that at which the amount of liquid displaced corresponds to their weight. Under such conditions the cross-piece 19 will, as shown, engage the stop pins 29, the floats 17 by virtue of their loose or pivotal connection with the opposite ends of the cross-piece 19 being permitted some freedom of swinging movement within the tank 10 without contact with the walls of the latter or the column 24. The floats therefore may move freely with the bar 20 without frictional opposition.

In accordance with the invention, the upper end of the bar 20 carries a yoke 30. The arms 31 of the latter are notched at their upper ends as at 32 to accommodate trunnions 33 which are carried by a receiver 34. The support of the receiver 34 in the manner described has the advantage that the receiver 34 may be removed from the yoke 31 with facility, either at will or automatically to discharge the weighed material.

The hooks 18 provide for free pivotal movement of the floats 17 relative to the ends of the cross-piece 19 carried by the bar 20. This free pivotal movement is conducive to several desirable functions which assure accurate and rapid weighing of individual loads. It avoids all strain on the cross-piece 19 such as would result if a rigid connection were provided between the floats 17 and said cross-piece, and also eliminates any tendency for the bar 20 to bind with respect to the guide rolls 22 and 23 and interfere with the free vertical movement of said bar with respect to said guide rolls. Moreover, the free pivotal connection between the floats 17 and the cross-piece 19 compensates for any off-level support of the weighing machine, and assures automatic, self-alignment of the floats 17 vertically in the liquid 12 at all times. The latter feature is important because it substantially eliminates all turbulence and wave motion in the liquid 12 as a result of the up and down movement of the floats 17. The liquid 12 is also maintained in a substantially motionless or quiescent state by making the floats 17 of small diameter and preferably preloading the same to maintain them submerged at a sufficient sub-normal depth such that the weight of the total volume of liquid displaced by said floats is substantially equal to the load or weight of the material to be weighed. In other words, in one operative form of the invention, the floats 17 are preferably maintained submerged to a sub-normal depth such that the buoyant force of the liquid acting upon the floats 17 is greater than the gravitational force of said floats, cross-piece 19, bar 20, receiver 34, etc., but has a definite ratio to the desired weight of the material to be weighed, and preferably closely approaches or is only slightly less than a force equal to said desired weight. In this manner, all hunting is eliminated, and various materials can be accurately weighed at high speed, irrespective of whether the desired predetermined weight is a matter of a fraction of an ounce or more. Making the lower ends of the floats 17 rounded or dome-shaped also reduces disturbances in the liquid 12 resulting from downward movement of said floats.

In the use of the machine the material to be weighed is introduced into the receiver 34. Preferably, the floats 17 are pre-loaded so that downward movement of the receiver 34 will not occur until the material approaches the predetermined weight. As noted, any desired pre-loading may be obtained by correcting the level of the liquid 12 in the tank 10 to correspond to the predetermined weight. Preferably the graduations on the gauge 16 are in terms of weight. Hence the liquid level may be readily adjusted to the desired height by reference to the gauge 16. In order to avoid the necessity of changing the volume of liquid in the tank when slight adjustments in the level of the liquid are desired, a displacing member 35 (Figure 2) is employed. The latter is suspended from the underside of the cover 21 by a threaded element 36, the lower end of the threaded element 36 occupying a threaded bore in the displacing member 35 and the upper end of the threaded element carrying a knob 37. The side wall of the knob 37 may be graduated in weight units such as ounces, for example, and a pointer 38 may cooperate with the dial so provided. Slight adjustments in the level of the liquid in the tank 10 may therefore be readily effected by turning the knob 37 to raise and lower the displacing member 35 as occasion may require. In order to prevent turning of the displacing member 35 with the threaded element 36, a guide rod 39 is preferably employed, the said rod extending through a bore 40 in the displacing member.

Figure 3:
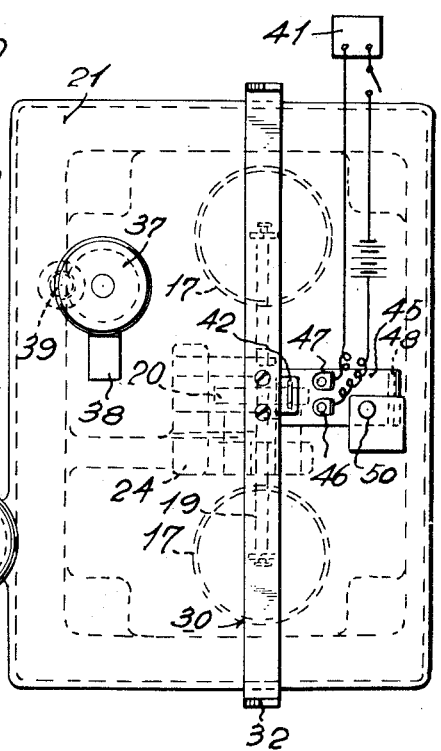
Figure 3 is a top plan view of the machine, the receiver being removed.

When the material being introduced into the receiver attains the proper weight, the floats 17 immediately permit the receiver 34 to move downwardly. As such movement occurs only when the material is of the proper weight, it may be availed of as an indication of such fact. Preferably, however, the downward movement of the receiver 34 is availed of to energize, or control the operation of, a suitable indicator 41 (Figure 3). To this end the bar 20 carries an electrically conductive bridge 42, the latter being suitably insulated from bar 20 by an insulating block 43 which is employed in mounting the bridge upon the bar. In the elevated position of the receiver 34, that is, the position in which the cross-piece 19 engages the stop pins 29, the ends of the bridge 42 are located slightly above and in spaced relation with respect to pools of mercury 44 or other electrically conductive liquid. The mercury pools 44 are insulated from one another, being carried by an insulating block 45. One of the mercury pools 44 is electrically connected to a terminal 46 on the block 45 while the other mercury pool is similarly connected to a terminal 47. The two mercury pools 44 therefore provide a normally open circuit for the indicator 41, the latter being energized only upon lowering of the bridge 42 to connect the two mercury pools. In order to adjust the circuit closing arrangement so that energization of the indicator 41 may be caused to occur at any desired predetermined movement of the receiver 34, the insulating block 45 is pivotally mounted at one end upon a pin 48. The latter permits a spring 49 to hold the block 45 against the lower end of a stop pin 50. Adjustment of the mercury pools 44 may therefore be accomplished by adjustment of the stop pin 50 which is threaded for this purpose. It will be apparent therefore that the signal arrangement may be adjusted so that the indicator 41 will be energized for any predetermined movement of the receiver 34, and as shown, the movement can be very small, resulting in the displacement of only a correspondingly small volume of liquid 12 by the downward movement of the floats 17.

It is to be understood that, although the movement of the weight-sensitive parts of the machine has been described and is illustrated in connection with an indicator, this is intended by way of illustration only. The features of the invention described are such as to enable the machine to be adapted with facility to various automatic dumping mechanisms if such use is desired. In such case, of course, the electrical circuit which is energized in the manner described may be employed in any suitable manner for controlling the operations which are carried out in connection with discharging of the weighed material.

It will be apparent from the foregoing that in the use of the machine, movement of the parts has been reduced to a minimum and that any tendency of the weight-sensitive parts to hunt is avoided. The machine has the further advantages that it will weigh accurately, is not unduly influenced by temperature changes and may be readily adjusted to respond to various weights.

Although the machine shown and described will enable the attainment of the objects set forth, various changes in, and modifications of, the construction and arrangement of the parts thereof may be made without departing from the spirit and scope of the invention as defined by the claims appended hereto.

I claim:

1. A weighing machine of the character described, including: a container having a body of liquid therein, liquid-displacing means buoyantly supported by said body of liquid, a receiver operatively connected with said liquid-displacing means and into which the material to be weighed is introduced, pre-loading means for maintaining said liquid-displacing means submerged in said liquid to a sub-normal depth sufficient to displace a volume of said liquid having a predetermined ratio relative to that of the weight of the load to be weighed, and guide means providing for free movement of said liquid-displacing means in response to the introduction of a given weight of said material into said receiver.

2. A weighing machine of the character described, including: a container having a body of liquid therein, liquid-displacing means buoyantly supported by said body of liquid, a receiver operatively connected with said liquid-displacing means and into which the material to be weighed is introduced, and means for pre-loading said liquid-displacing means so as to maintain said liquid-displacing means submerged in said liquid to a depth sufficient to displace a volume of said liquid having a weight substantially equal to that of the load to be weighed, whereby movement of said liquid-displacing means in response to the material introduced into said receiver will occur only as the weight of such material approaches a predetermined weight.

3. A weighing machine of the character described, including: a container having a body of liquid therein, liquid-displacing means buoyantly supported by said body of liquid, a receiver operatively connected with said liquid-displacing means and into which the material to be weighed is introduced, means for pre-loading said liquid-displacing means so as to maintain said liquid-displacing means submerged in said liquid to a depth sufficient to displace a volume of said liquid having a weight substantially equal to that of the load to be weighed, whereby movement of said liquid-displacing means in response to the material introduced into said receiver will occur only as the weight of such material approaches a predetermined weight, and means actuable in response to such movement of said liquid-displacing means.

4. A weighing machine of the character described, including: a container having a body of liquid therein, liquid-displacing means buoyantly supported by said body of liquid, a receiver operatively connected with said liquid-displacing means and into which the material to be weighed is introduced, means for pre-loading said liquid-displacing means, whereby movement of the latter in response to the material introduced into said receiver will occur only as the weight of such material approaches a predetermined weight, means responsive to the movement of said liquid-displacing means when such movement corresponds to said predetermined weight, and an electrical circuit for energizing said last-mentioned means, said circuit including pools of electrically conductive liquid, and a bridge which moves with said liquid-displacing means to connect said pools.

5. A weighing machine of the character described, including: a container having a body of liquid therein, liquid-displacing means buoyantly supported by said body of liquid, a receiver operatively connected with said liquid-displacing means and into which the material to be weighed is introduced, means for pre-loading said liquid-displacing means, whereby movement of the latter in response to the material introduced into said receiver will occur only as the weight of such material approaches a predetermined weight, means responsive to the movement of said liquid-displacing means when such movement corresponds to said predetermined weight, an electrical circuit for energizing said last-mentioned means, said circuit including pools of electrically conductive liquid, a bridge which moves with said liquid-displacing means to connect said pools, and means for initially adjusting the relative positions of said pools and bridge.

6. A weighing machine of the character described, including: a container having a body of liquid therein, liquid-displacing means buoyantly supported by said body of liquid, a receiver operatively connected with said liquid-displacing means and into which the material to be weighed is introduced, means for pre-loading said liquid-displacing means so as to maintain said liquid-displacing means submerged in said liquid to a depth sufficient to displace a volume of said liquid having a weight substantially equal to that of the load to be weighed, whereby movement of said liquid-displacing means in response to the material introduced into said receiver will occur only as the weight of such material approaches a predetermined weight, and liquid-displacing means independent of said first-mentioned liquid-displacing means, said second-mentioned liquid-displacing means being adjustable to vary the level of said body of liquid to vary the pre-loading of said first-mentioned liquid-displacing means.

7. A weighing machine of the character described, including: a container having a body of liquid therein, liquid-displacing means buoyantly supported by said body of liquid, a receiver operatively connected with said liquid-displacing means, means for pre-loading said liquid-displacing means so as to maintain said liquid-displacing means submerged in said liquid to a depth sufficient to displace a volume of said liquid having a weight substantially equal to that of the load to be weighed, whereby movement of said liquid-displacing means in response to the material introduced into said receiver will occur only as the weight of such material approaches a predetermined weight, liquid-displacing means independent of said first-mentioned liquid-displacing means, said second-mentioned liquid-displacing means being adjustable to vary the level of said body of liquid to vary the pre-loading of said first-mentioned liquid-displacing means, and means responsive to such movement of said first-mentioned liquid-displacing means.

8. A weighing machine of the character described, including: a container having a body of liquid therein, a pair of spaced-apart, liquid-displacing floats buoyantly supported by said liquid, a vertical bar located between said floats, anti-friction guide rollers engaging said bar at spaced points and at opposite sides and which permit free movement thereof in the direction of its length, means pivotally connecting said bar with the lower ends of said floats, and a receiver supported on said bar adapted to receive the material to be weighed.

9. A weighing machine of the character described, including: a container having a body of liquid therein, a pair of spaced-apart, liquid-displacing floats buoyantly supported by said liquid, a vertical bar located between said floats, anti-friction guide rollers which engage said bar at spaced points and at opposite sides and which permit it free movement in the direction of its length, studs which provide eccentric mountings for said rollers and which are adjustable to move the latter toward and away from said bar, means connecting said bar to the lower ends of said floats, and a receiver supported on said bar adapted to receive the material to be weighed.

10. A weighing machine of the character described, including: a container having a body of liquid therein, a pair of spaced-apart, liquid-displacing floats buoyantly supported by said liquid, a vertical bar located between said floats and guided for free movement in the direction of its length, a cross-piece connected to said bar, means pivotally connecting the lower ends of said floats with said cross-piece, and a receiver supported on said bar adapted to receive the material to be weighed.

11. A weighing machine of the character described, including: a container having a body of liquid therein, a pair of spaced-apart, liquid-displacing floats buoyantly supported by said liquid, a vertical bar located between said floats and guided for free movement in the direction of its length, a cross-piece connecting the lower ends of said floats to the lower end of said bar, a receiver supported on said bar adapted to receive the material to be weighed, and means for engaging said cross-piece to pre-load said floats.

12. A weighing machine of the character described, including: a container having a body of liquid therein, a pair of spaced-apart, liquid-displacing floats buoyantly supported by said liquid, a vertical bar located between said floats and guided for free movement in the direction of its length, means connecting said floats with said bar, a receiver supported on said bar adapted to receive the material to be weighed, and means pre-loading said floats so as to maintain said floats submerged in said liquid to a depth sufficient to displace a volume of said liquid having a weight substantially equal to that of the load to be weighed, whereby downward movement of said floats in response to the material introduced into said receiver occurs only as the weight of such material approaches a desired predetermined weight.

13. A weighing machine of the character described, including: a container having a body of liquid therein, a pair of spaced-apart, liquid-displacing floats buoyantly supported by said liquid, a vertical bar located between said floats and guided for movement in the direction of its length, means connecting said floats with said bar, a receiver supported by said bar and adapted to receive the material to be weighed, means pre-loading said floats so as to maintain said floats submerged in said liquid to a depth sufficient to displace a volume of said liquid having a weight substantially equal to that of the load to be weighed, whereby the movement of said floats in response to the material introduced into said receiver will occur only as the weight of such material approaches a desired predetermined weight, and means for varying the amount of pre-loading of said floats.

14. A weighing machine of the character described, including: a container having a body of liquid therein, a pair of spaced-apart, liquid-displacing floats buoyantly supported by said liquid, a vertical bar located between said floats and guided for movement in the direction of its length, means connecting said floats with said bar, a receiver supported on said bar adapted to receive the material to be weighed, means for preloading said floats so that movement of the latter in response to the material introduced into said receiver will occur only as the weight of such material approaches a desired predetermined weight, and liquid-displacing means independent of said floats for varying the level of said liquid and in so doing varying the pre-loading of said floats.

15. A weighing machine of the character described, including: a container having a body of liquid therein, a pair of spaced-apart, liquid-displacing floats buoyantly supported by said liquid, a vertical bar located between said floats and guided for movement in the direction of its length, means connecting said floats with said bar, a receiver supported on said bar adapted to receive the material to be weighed, means for pre-loading said floats so that movement of the latter in response to the material introduced into the receiver will occur only as the weight of such material approaches a desired predetermined weight, means independent of said floats for varying the level of said liquid and in so doing varying the level of said floats, and an adjustable element for moving said last-mentioned means.

16. A weighing machine of the character described, including: a container having a body of liquid therein, a pair of spaced-apart, liquid-displacing floats buoyantly supported by said liquid, a vertical bar located between said floats and guided for movement in the direction of its length, means connecting said floats with said bar, a receiver supported on said bar adapted to receive the material to be weighed, means for pre-loading said floats so that movement of the latter in response to the material introduced into said receiver will occur only as the weight of such material approaches a desired predetermined weight, a liquid-displacing member for varying the level of said liquid and in so doing varying the pre-loading of said floats, a guide for said member, and a threaded element for moving said member.

17. A weighing machine of the character described, including: a container having a body of liquid therein, a pair of spaced-apart, liquid-displacing floats buoyantly supported by said liquid, a vertical bar located between said floats and guided for movement in the direction of its length, a cross-piece carried by the lower end of said bar, means connecting said cross-piece with the lower ends of said floats, a receiver supported on said bar adapted to receive the material to be weighed, means for pre-loading said floats so that movement of the latter in response to the material introduced into said receiver will occur only as the weight of such material approaches a desired predetermined weight, a liquid-displacing member for varying the level of said liquid and in so doing varying the pre-loading of said floats, a vertical guide for said member, and means for adjusting said member along said guide.

18. A weighing machine of the character described, including: a container having a body of liquid therein, a pair of spaced-apart, liquid-displacing floats buoyantly supported by said liquid, a vertical bar located between said floats and guided for movement in the direction of its length, a cross-piece carried by the lower end of said bar, means connecting the lower ends of said floats with said bar, a receiver supported on said bar adapted to receive the material to be weighed, means engageable with said cross-piece for limiting upward movement of said floats, whereby to enable the latter to be pre-loaded, a liquid-displacing member for varying the level of said liquid and in so doing varying the pre-loading of said floats, a vertical guide for said member, and a threaded element for adjusting said member along said guide.

19. A weighing machine for weighing individual loads of material of a given weight, comprising: a container for a body of liquid, weighing means including float means adapted to be buoyantly supported by the liquid, and means for pre-loading said float means by normally maintaining said float means submerged in the liquid to a sub-normal depth sufficient to displace a volume of the liquid having a predetermined weight relative to the load to be weighed.

20. A weighing machine as defined in claim 19, including means for varying the depth of submergence of the float means to vary the pre-loading thereof.

21. A weighing machine as defined in claim 19, in which the pre-loading means maintains the float means submerged to a depth such that the volume of liquid displaced has a weight substantially equal to that of the desired load.

22. A weighing machine as defined in claim 19, in which the pre-loading means includes stop means limiting the upward movement of the float means in the liquid.

23. A weighing machine as defined in claim 19, in which the pre-loading means is arranged to limit the upward movement of the float means, and means for varying the liquid level in the container to thereby vary the pre-loading of the float means.

24. A weighing machine as defined in claim 19, in which the float means includes at least one elongated float having a small diameter compared to its height.

25. A weighing machine as defined in claim 19, including means providing a pivotal connection between the pre-loading means and the float means.

26. A weighing machine, comprising: a container for a body of liquid; liquid-displacing means adapted to be buoyantly supported in said body of liquid; a receiver supported by said liquid-displacing means adapted to receive the material to be weighed; means for retaining said liquid-displacing means submerged in said liquid below a depth which it would normally occupy to thereby effect pre-loading thereof, whereby movement of said liquid-displacing means in response to the material introduced into said receiver will occur only as the weight of such material reaches a predetermined weight; and signal means arranged so that it is actuated in response to said movement of said liquid-displacing means.

27. A weighing machine of the character described, including: a container having a body of liquid therein; at least one liquid displacing float buoyantly supported by said liquid; a vertical bar; means guiding said bar for lengthwise movement; means pivotally connecting said float with said bar with the float laterally spaced from said bar; and a receiver supported on said bar adapted to receive the material to be weighed.

28. A weighing machine of the character described, including: a container having a body of liquid therein; at least one substantially cylindrical liquid displacing float buoyantly supported by said liquid, the lower end of said float being rounded to reduce turbulence; a vertical bar; means guiding said bar for lengthwise movement; means pivotally connecting the lower rounded end of said float with said bar; and a receiver supported on said bar adapted to receive the material to be weighed.

29. A weighing machine of the character described, including: a container having a body of liquid therein; at least one liquid displacing float buoyantly supported by said liquid; a vertical bar; means guiding said bar for lengthwise movement; means including a hook detachably connecting the lower end of said float with said bar; and a receiver supported on said bar adapted to receive the material to be weighed.

GLEN MELVIN TRACY.

REFERENCES CITED

The following references are of record in the file of this patent:

UNITED STATES PATENTS

| Number | Name | Date |
|---|---|---|
| 1,013,479 | Elliott et al. | Jan. 2, 1912 |
| 1,384,263 | Larsen | July 12, 1921 |
| 1,425,466 | Frame | Aug. 8, 1922 |
| 1,736,079 | Hallwood | Nov. 19, 1929 |
| 1,880,436 | Haskins | Oct. 4, 1932 |
| 2,126,377 | Fear et al. | Aug. 9, 1938 |
| 2,298,086 | Rogers | Oct. 6, 1942 |
| 2,352,906 | Lyons | July 4, 1944 |